United States Patent [19]

Eertink et al.

[11] Patent Number: 4,516,019
[45] Date of Patent: May 7, 1985

[54] LIGHT DETECTOR CIRCUIT

[75] Inventors: Bastiaan B. B. Eertink, Grubbenvorst; Hendrikus J. van Esch, Veldhoven, both of Netherlands

[73] Assignee: Océ-Nederland B.V., Venlo, Netherlands

[21] Appl. No.: 398,795

[22] Filed: Jul. 16, 1982

[30] Foreign Application Priority Data

Jul. 21, 1981 [NL] Netherlands .......................... 8103439

[51] Int. Cl.³ ............................................. H01J 40/14
[52] U.S. Cl. ............................. 250/214 RC; 307/311
[58] Field of Search ............ 250/214 R, 214 RC, 206, 250/214 AG; 307/311, 358, 359

[56] References Cited

U.S. PATENT DOCUMENTS

| 3,576,452 | 3/1971 | Smith | 307/311 |
| 3,911,268 | 10/1975 | Mori et al. | 250/214 R |
| 4,027,154 | 5/1977 | Flint | 250/214 |
| 4,032,777 | 6/1977 | McCaleb | 250/214 RC |
| 4,095,887 | 6/1978 | van Herten et al. | 335/3 |
| 4,438,348 | 3/1984 | Casper et al. | 307/311 |

OTHER PUBLICATIONS

IBM Technical Disclosure Bulletin–"Wide-Response Amplifier With Automatic Threshold Control", vol. 8, No. 4, Sep. 1965, pp. 690–691.

Primary Examiner—David C. Nelms
Assistant Examiner—J. Jon Brophy
Attorney, Agent, or Firm—Albert C. Johnston; Louis H. Reens

[57] ABSTRACT

A light detector circuit is described in which the baseline level of the output signal of a light detector is stabilized by feeding back a control signal to an element that has a voltage variable resistance and is connected in series with the light detector across a voltage source. Several embodiments are shown. In one embodiment a differential amplifier circuit with an integrating feedback circuit is employed to establish a stabilized control voltage.

11 Claims, 5 Drawing Figures

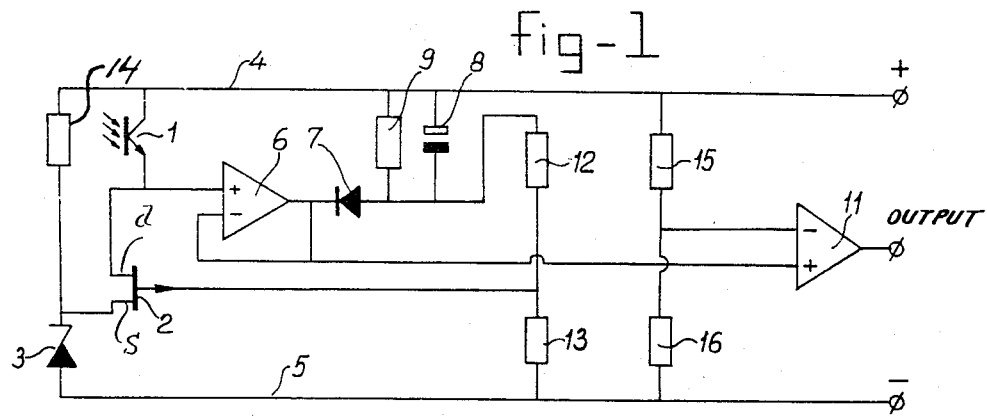
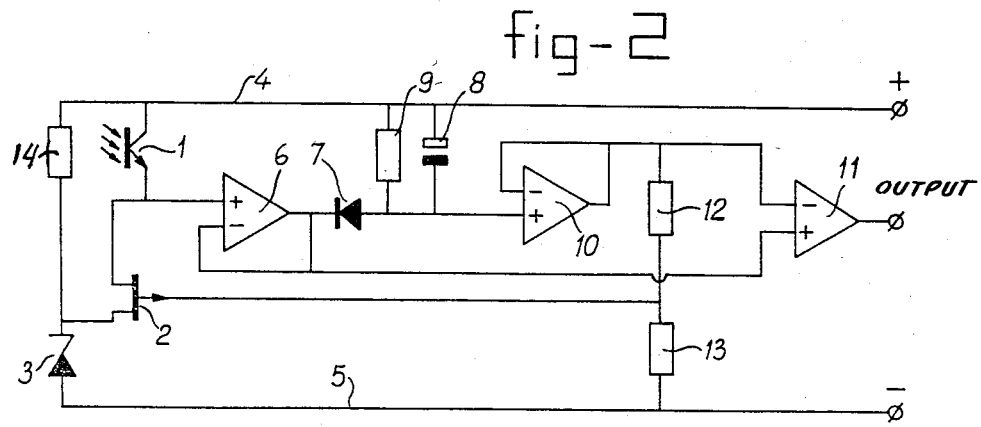
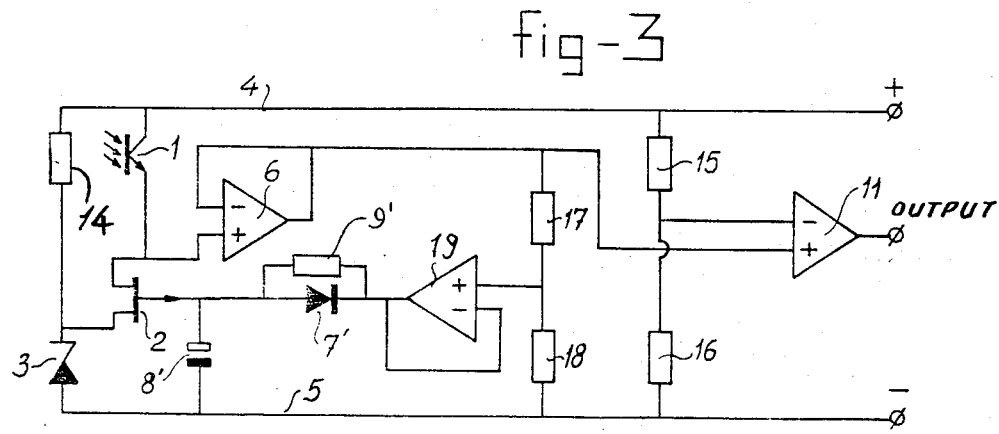

LIGHT DETECTOR CIRCUIT

This invention relates to a light detection circuit of the type for sensing short duration light changes by using a light detector whose output is coupled to a comparator for delivering a signal representative of the brief light changes and to a signal leveling circuit with which an output level of the detector is kept even over short time periods so as to enable a correction for gradual shifts of the detector output level with a voltage control circuit. More specifically, the invention relates to a light detection circuit for use in an electrophotographic copying apparatus to detect markings on a photoconductive belt or as a sheet sensor in such copying apparatus.

Such a circuit is known from U.S. Pat. No. 4,095,887, which describes such circuit particularly for use in detecting markings on the rear side of a photo-conductive belt in an electrophotographic device. Such markings may be, for example, black areas that are applied to the rear side of a light colored belt, or lighter colored, e.g. silver colored, areas applied on a dark rear side. These markings are rendered detectable by means of a light-emitting diode, LED, which emits light towards the rear of the photo-conductive belt from which reflected light is intercepted by a light detector such as a photo-sensitive transistor. With the known circuit the light detector is connected by way of a resistor to a voltage source and the LED is connected via a transistor to the supply voltage. The quantity of light emitted by the LED thus depends on the magnitude of the conduction by this transistor.

In the above described known circuit the light detector causes, via an isolation stage, an output signal which is fed to the input of the signal leveling circuit as well as to a first input of a comparator. The other input of the comparator is connected to a fixed reference voltage. This reference voltage is so selected that the detection of reflected light from the rear side of the belt causes an output signal from the light detector that is lower than the reference voltage, thus producing a first comparator output level. When a marking is detected a discrete amount of more or less light is then intercepted by the light detector, and the output signal becomes higher than the reference voltage, causing the comparator output to be at a second level.

Output currents through light detectors such as photo-transistors may vary by a factor of 100 or more due to sample variations, aging phenomena, or variations of the ambient conditions such as, for example, temperature fluctuations, even though the same amount of light is obtained from the illumination source, such as a LED.

In the known circuit described in the U.S. Pat. No. 4,095,887 patent, such current variations are compensated for by automatically adjusting the intensity of the light source. The output signal from the light detector is fed to a signal leveling circuit which includes a diode, a capacitor and a resistor. The output from this circuit provides a signal by means of which the current through the light source, i.e. through the LED, is influenced. During detection of the rear side of the belt the capacitor becomes charged to a constant voltage level which corresponds to the state of conductivity of the light detector in the absence of a marking. The voltage developed across the capacitor is applied through a control stage to establish the current through the LED at a certain baseline value.

If now, for example, the light detector becomes less sensitive, or the light output from the LED reduces, then the output voltage from the light detector will drop, causing the voltage across the capacitor to increase. The increased capacitor voltage acts via a control stage to increase the current through the LED so as to compensate for the reduced sensitivity of the light detector or the reduced light output from the LED. In case of an increase in the sensitivity of the light sensitive detection element, or in the light output from the LED, then, conversely, the current through the LED is reduced.

To ensure that this feed-back does not come into action upon the detection of a marking, the RC-time constant of the discharge path or charge path associated with the capacitor must be selected sufficiently high so that the transient voltage variation at the output of the light detector upon detection of a marking does not lead to a change in the baseline setting of the LED current.

The output voltage from the light detector is preferably biased at a level that is one-half the supply voltage level. At such level the light detection circuit is most sensitive, i.e. the output voltage change per unit of change in light intensity is greatest. The reference voltage which is supplied to the second input of the comparator is matched to this setting.

In the event, however, of a change in the sensitivity, whether higher or lower, of the light detector, or a change in the light output from the LED, the output voltage setting of the detection circuit will vary. For example, if the detector becomes less light sensitive, then the detection circuit will adjust itself in such a way that the LED emits more light. This means that the output voltage of the light detector becomes lower, the voltage across the capacitor increases, and thus the current through the LED increases to compensate for the loss in sensitivity. As a result of this permanent drop in the output voltage level of the light detector, there is a permanent deviation from the preferential setting where this output voltage level is at half the supply level. Hence, the sensitivity of the circuit as a whole reduces.

The permanent deviation of the output of the detection circuit furthermore alters the optimum relationship between the output voltage and the reference voltage at the comparator. Similarly, a change occurs with an increase in the light sensitivity of the detector.

It is, therefore, an object of the present invention to provide a circuit by which these disadvantages arising from the compensation for changes in the sensitivity of the light detector or an output from the light source can be eliminated.

This object is achieved according to the invention by a light detection circuit which is of the type described above but includes a voltage control circuit with a stabilizing element that is a voltage variable resistance and is connected in series with the light detector across a voltage source of fixed potential. In a circuit according to the invention the LED which functions as the light source operates at a fixed current setting and the voltage variable resistance element is controlled in such a way that the voltage developed in the absence of a marking at the junction between this element and the light detector is maintained as close as practicable at a fixed potential.

Several embodiments of the invention with associated advantages and with further details of the detection circuit repetition are described below with reference to the drawings.

FIG. 1 is a schematic diagram of a first circuit according to the invention;

FIG. 2 is a schematic diagram of a second circuit according to the invention;

FIG. 3 is a schematic diagram of a third circuit according to the invention;

Figure 4:
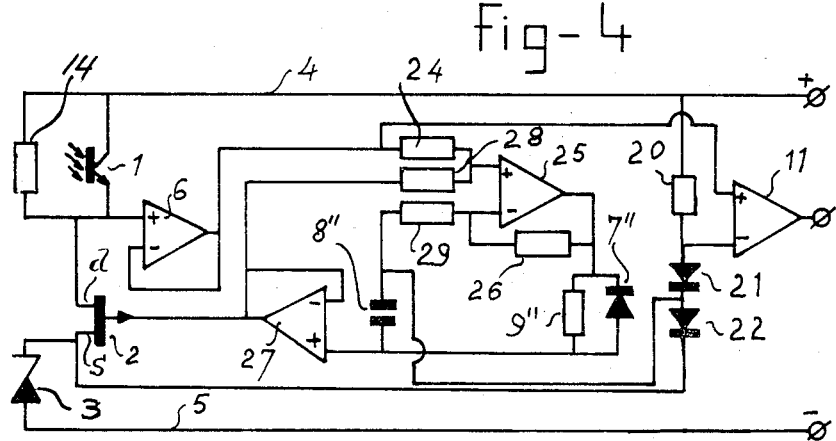
FIG. 4 is a schematic diagram of a fourth circuit according to the invention.

In FIG. 1 a photo-sensitive transistor 1 is shown connected in series with a field effect transistor (FET) 2 and a zener diode 3 between the supply voltage positive lead 4 and the supply voltage negative lead 5. The voltage at the junction between the emitter of the photo-transistor 1 and the drain d of the FET 2 is connected to the positive input of an operational amplifier 6, the output of which is fed back to the negative input of amplifier 6. The output of the operational amplifier 6 is connected to the positive input of a comparator 11 and also, via a diode 7, to the junction of a parallel connected capacitor 8 and a resistor 9. The second junction of the parallel connected capacitor 8 and resistor 9 is connected to the supply voltage positive lead 4. The first-mentioned junction of resistor 9, capacitor 8 and diode 7 is connected to one end of a voltage divider formed by resistors 12 and 13, the other end of the voltage divider being connected to the supply voltage negative lead 5. The junction between the resistors 12 and 13 is connected to the gate of the FET 2. The junction between the source s of the FET 2 and the zener diode 3 is connected via a resistor 14 to the supply voltage positive lead 4. The negative input of comparator 11 is maintained at a fixed reference potential by a voltage divider formed of resistors 15 and 16.

In the circuit shown in FIG. 1 the feed-back-connected operational amplifier 6 serves only as a buffer stage. The light detector is a photo-transistor 1, the comparator is formed by the comparator 11, the signal leveling circuit comprises the diode 7, the resistor 9 and the capacitor 8, while the FET 2 forms the voltage variable resistance element of the voltage stabilizing circuit.

In the following description of the operation of the detection circuit of FIG. 1, it is assumed that the circuit is used to sense light markings on a photoconductive belt having a darker background. Hence, the phototransistor 1 will be unilluminated or only slightly illuminated for a relatively long period while during the passage of a marking a relatively large amount of light is cast upon the transistor 1 for a short period.

During the detection of the darker background when photo-transistor 1 receives relatively litle light, the photo-transistor 1 will not conduct, or hardly conduct at all. Hence, the voltage level at the emitter of transistor 1 and thus also at the output of operational amplifier 6 will be low. The output signal from the operational amplifier 6 is fed to the positive input of comparator 11 for its comparison with the fixed reference voltage at the negative input of comparator 11 as derived from resistors 15 and 16.

Since the reference voltage is selected to be greater than the voltage at the positive input, the output level or baseline voltage of comparator 11 will be low during the detection of the background of the photoconductive belt. When, during detection of a marking by the transistor 1, a relatively large amount of light is received, transistor 1 will conduct more heavily so that the emitter voltage of transistor 1 and thus also the output voltage of operational amplifier 6 will increase to a level that is higher than the reference voltage at the negative input of comparator 11. As a result, the output level of comparator 11 will be high during the detection of a marking.

The output of operational amplifier 6 is also connected to diode 7 and, through this diode to capacitor 8 whose terminal connected to the diode 7 is charged to the voltage level present at the output of the operational amplifier 6 less the voltage drop across diode 7. The voltage at the junction between the diode 7, resistor 9 and capacitor 8 is at the same time connected via a voltage divider formed by resistors 12 and 13 as a control voltage to the gate of field effect transistor FET 2. The RC-time constant of resistor 9 and capacitor 8 is selected of such duration that during detection of a marking, when the output voltage of operational amplifier 6 becomes transiently high, the capacitor 8 cannot discharge, or will hardly be capable of discharging through resistor 9. The level of the output signal from transistor 1, as well as the level of the gate control voltage of FET 2, as obtained through the operational amplifier 6 and the voltage divider formed by resistors 12 and 13, thus depend on the amount of light which arrives at transistor 1 during detection of the background of the photoconductive belt.

If now, for example, as a result of a decreased sensitivity of the transistor 1 or a decreased light emission from the light source, which is not shown, the voltage at the output of transistor 1 should gradually reduce, this will lead to an increased charge across capacitor 8 with a lower voltage at its junction with diode 7. Consequently, the control voltage at the gate of FET 2 is reduced and FET 2 will become less conductive. This in turn increases the voltage at the emitter of transistor 1 to thus compensate for the latter's reduced conduction in such a way that the voltage at the positive input of amplifier 6 will remain almost constant.

If, during detection of the background of the photoconductive belt, for some reason or other, due to for example an increase in the sensitivity of transistor 1 or a greater light emission from the light source, not shown, the voltages at the output of transistor 1 and at the output of operational amplifier 6 increase, the capacitor 8 will discharge to some extent through resistor 9 and by this means, a higher voltage will be supplied to the gate of FET 2 via the resistors 12 and 13, as a result of which the resistance of the FET 2 will be reduced. This in turn reduces the voltage at the emitter of the photo-transistor 1 to thus compensate for the latter's increased conduction in such a way that the voltage at the positive input of amplifier 6 will remain almost constant.

It should be noted that the zener diode 3 and the resistor 14 are provided only for purposes of the interconnection of the FET 2, which can be interconnected also in other ways.

FIG. 2 shows a second embodiment of a detection circuit according to the invention. In this figure corresponding components are denoted by the same reference numbers as in FIG. 1. A close study of this Figure shows that the negative input of the comparator 11 in this embodiment is not connected to a fixed reference voltage, but is connected via a feed-back-connected operational amplifier 10 to capacitor 8. As in the embodiment of FIG. 1, the control voltage for the gate of the FET is supplied by the voltage divider formed by resistors 12 and 13, but which in this case are connected through operational amplifier 10 to capacitor 8. In FIG. 2 the voltage across the capacitor 8 is thus also employed as the reference voltage for comparator 11.

During detection of the background of a photoconductive belt, the voltage at the negative input of comparator 11 will be higher than the voltage at its positive input, due to the voltage drop across diode 7. When a marking is detected, the output voltage of operational amplifier 6 will transiently increase. Because of the relatively long RC-time constant of resistor 9 and capacitor 8, the voltage across capacitor 8 and, hence, the voltage at the negative input of comparator 11 will remain almost constant. Hence, during detection of a marking the output voltage of comparator 11 will proceed from low to high. The operation of this detection circuit, especially the influence of the feed-back path with its FET 2 on the behaviour of the detection circuit, is identical to the operation of the first embodiment of the detection circuit described above with reference to FIG. 1.

FIG. 3 shows a third embodiment of a detection circuit according to the invention. In this figure corresponding components are also indicated by the same reference numbers. The emitter of the photo-sensitive transistor 1 is again connected to the positive input of the operational amplifier 6, the output of which is fed back to the negative input. The output of this operational amplifier 6 is again connected to the positive input of comparator 11. The negative input of comparator 11 is connected to a fixed reference voltage derived from the voltage divider formed by resistors 15 and 16. The emitter of the photo-sensitive transistor 1 is again connected to the drain of the FET 2, the source of which is set at a voltage determined by the resistor 14 and the zener diode 3. The output of the operational amplifier 6 is also connected to the positive input of an operational amplifier 19, via the voltage divider formed by resistors 17 and 18. The output of amplifier 19 is fed back to the negative input of this amplifier and at the same time is connected through a parallel connected diode 7' and resistor 9' to one terminal of capacitor 8' and the gate of the FET 2. The other terminal of capacitor 8' is connected to the negative supply voltage lead 5.

The operation of the detection circuit of FIG. 3 upon detection of a marking is identical to the operation of the detection circuit according to FIG. 1. During detection of the background of a photoconductive belt, the voltage at the emitter of the photo-sensitive transistor 1, and thus also the output voltage from the operational amplifier 6, will again be at a relatively low level. A part of this relatively low output voltage is transmitted by the voltage divider formed of resistors 17 and 18 to the output of the amplifier 19. The capacitor 8' is charged up through resistor 9' to a voltage level determined by the output voltage of the operational amplifier 19. If, for some reason, the sensitivity of the photo-transistor 1 reduces, or the light emission from the light source, not shown, reduces, then the voltage at the emitter of the phototransistor 1 will drop.

This voltage drop is conveyed, via amplifier 6, resistors 17 and 18, and amplifier 19 to the signal leveling circuit formed by diode 7', capacitor 8' and resistor 9'. As a result, capacitor 8' will discharge slightly through diode 7', resulting in a reduced gate control voltage for the FET 2, so that the resistance of this FET 2 will increase and thus conduct current to a lesser extent. This reduced current conduction compensates for the reduced conduction of the photo-sensitive transistor 1 in the same way as described above with reference to FIGS. 1 and 2 for the first two embodiments of the detection circuit according to the invention. Conversely, an increased sensitivity or increased light output will result in increasing the conduction of FET 2 to compensate for the increased conduction of photo-transistor 1.

It should be noted that the operational amplifiers 6, 10 and 19 employed in FIGS. 2 and 3 serve only as buffer stages. It furthermore should be understood that the interconnection of the FET 2 can be effected in a way other than via the resistor 14 and zener diode 3.

FIG. 4 shows a fourth embodiment of the detection circuit according to the invention. In this Figure corresponding components are also denoted by the same reference numbers. The emitter of the photo-sensitive transistor 1 is again connected to the positive input of the operational amplifier 6, the output of which is fed back to its negative input. The output of operational amplifier 6 is again connected to the positive input of comparator 11. The negative input of comparator 11 receives a fixed reference voltage derived from a voltage divider from a voltage divider formed by resistor 20, diodes 21 and 22 and the zener diode 3. The emitter of photo-sensitive transistor 1 is again connected to the drain d of the FET 2, the source s of which is biased by resistor 20 and zener diode 3.

The output of amplifier 6 is also connected via a resistor 24 to the positive input of a differentially connected operational amplifier 25, the output of which is fed back to its negative input by resistor 26 and by an integrating feedback circuit. The output of operational amplifier 25 is also connected, by parallel connected diode 7" and resistor 9" to one terminal of capacitor 8" as well as to the positive input of an operational amplifier 27. The output of amplifier 27 is connected to its negative input, to the gate of FET 2 and through a resistor 28 to the positive input of operational amplifier 25 to complete the integrating feedback loop. The other terminal of capacitor 8" is connected to the voltage divider formed by resistor 20, diodes 21 and 22 and the zener diode 3, as well as through resistor 29 to the negative input of operational amplifier 25. Resistors 24 and 28 from a summation circuit, while operational amplifier 25 is connected as a differential amplifier. The operational amplifiers 6 and 27 serve as buffer amplifiers having a low output impedance, so that longer leads can be used, if required, between the section formed by components 1, 2, 3, 6 and 14 and the remainder of the circuit of FIG. 4.

During detection of a dark background of a photoconductive belt the voltage at the emitter of photo-sensitive transistor 1, and thus also the output voltage from operational amplifier 6, will again be at a relatively low level. This voltage is fed via resistor 24 to the positive input of operational amplifier 25. The feed-back loop formed by resistor 9", operational amplifier 27 and resistor 28, as well as the feed-back loop formed by resistor 9", operational amplifier 27, FET 2, photo-sensitive transistor 1, operational amplifier 6 and resistor 24, establish an equilibrium voltage value at the output of the operational amplifier 25. Since the first-mentioned loop forms an integrating circuit with capacitor 8", the junction of photo-sensitive transistor 1 and FET 2 is set to a voltage which is nearly half the supply voltage by the control voltage from amplifier 27.

This setting to half the supply voltage is to a very large degree independent of the value of the parameters of FET 2. This is in contrast with the circuits shown in FIGS. 1, 2 and 3 in which the FET 2 parameters certainly have a marked influence on the setting at the emitter of photo-transistor 1.

When a marking is detected by the photo-sensitive transistor 1, it will receive a relatively large amount of light and exhibit an increased conduction. As a result, the emitter voltage of transistor 1 and the output voltage of amplifier 6 will increase and become greater than the reference voltage across the negative input of comparator 11. By this means the output level of comparator 11 will be high during the detection of a marking.

The output voltage from differential amplifier 25 is also high during detection of a marking. This latter increase in level cannot be transmitted through diode 7″ to the operational amplifier 27 because of the manner in which diode 7″ is connected in the circuit. The increase in the output voltage of differential amplifier 25 as coupled through resistor 9″ to the positive input of operational amplifier 27 is delayed by virtue of the time it takes to charge capacitor 8″ to the higher level. The values of resistor 9″ and capacitor 8″ are so selected that their RC-time constant is of sufficient duration to maintain the setting of FET 2 essentially unchanged during the detection of a marking.

As soon as a marking has passed by photo-sensitive transistor 1, the emitter voltage of transistor 1 drops. This reduction gives rise directly to a reduction in the output level of both comparator 11 and of differential amplifier 25. The reduction in the output voltage of differential amplifier 25 is followed directly by a reduction in the voltage across the positive input of operational amplifier 27 because diode 7″ becomes forwardly biased with a low resistance as a result of which the capacitor 8″ can be discharged extremely rapidly to the lower output level of amplifier 25.

A gradual change in the voltage of the emitter of photo-sensitive transistor 1 will, as already noted in connection with the description of the circuit shown in FIG. 1, always result in a change in the setting of FET 2 to oppose the gradual change. Since the feed-back loop from the output of differential amplifier 25 via resistor 9″, operational amplifier 27 and resistor 28 forms an integrating circuit with capacitor 8″, such gradual change at the emitter of photo-transistor 1 will in due time always be fully compensated for.

Figure 5:
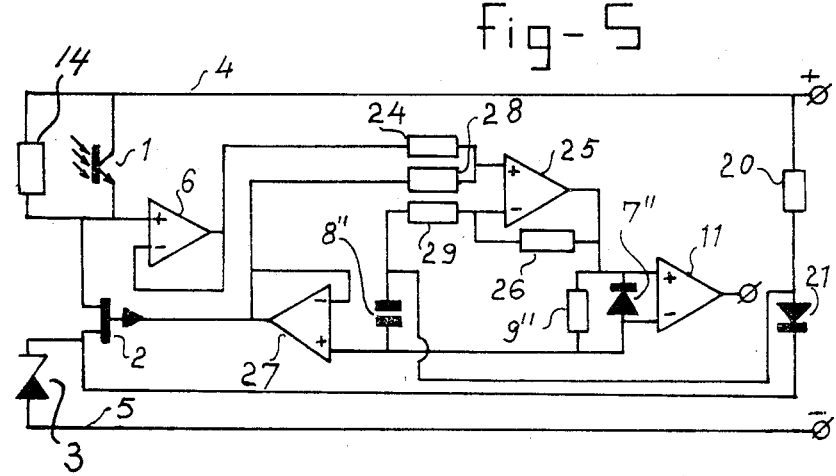
FIG. 5 is a schematic diagram of a fifth circuit according to the invention.

FIG. 5 shows a fifth embodiment of a circuit according to the invention. In this Figure corresponding components are also denoted by the same reference numbers. For a description of the circuit according to FIG. 5 reference should be made to the description of the circuit according to FIG. 4, with respect to which the following changes have been made. Diode 21 has been omitted and comparator 11 has its positive input connected to the output of differential amplifier 25, and its negative input connected to the junction of resistor 9″, diode 7″ and capacitor 8″.

With regard to the equilibrium setting of the circuit according to FIG. 5, reference should be made to the description of the circuit according to FIG. 4, since the described connections for the inputs of comparator 11 in FIG. 5 with its very high input impedance do not affect the operation. The response of comparator 11 to the detection of a marking is in the circuit of FIG. 5 also in the direction of an increase in output level for reasons as have been already described in conjunction with FIG. 4. During detection of the background of a photoconductive belt the voltage at the cathode of diode 7″ is lower than the voltage at its anode, and during detection of a marking the voltage at the cathode is greater than the voltage at the anode. The sensitivity of this circuit is considerably greater than that of the circuits according to the preceding Figures.

In the above description of the operation of the embodiments, it has been assumed that a photoconductive belt background which reflects very little light is used with markings which reflect relatively a great deal of light. By means of a slight change the circuits illustrated and described herein can also be employed for detection of a background which reflects a great deal of light and having markings which reflect very little light. In such case the diodes 7, 7′ and 7″ respectively in the Figures have to be changed in polarity and the combination of the resistor 9, 9′ and 9″ respectively, and capacitor 8, 8′ and 8″ respectively must be connected to a lower fixed voltage.

It should furthermore be apparent that further modifications and changes are feasible within the framework of the invention. It should also be clear that the meaning of the term "marking" in the framework of the invention described should be broadly construed with a scope which is broader than the meaning which this term has in the known state of the art. For example, the detection circuit of this invention is extremely useful as a sensor for detecting the presence of an original in the feed path for an original in a copying device. If the sensor has to be placed on one side of the path traversed by the original, by which the light emitted from the light source to the original is reflected to the photo-sensitive transistor 1, the circuits can then be employed in the form as described here. If the light source and the photo-sensitive transistor 1 are placed opposite each other on either side of the path traversed by the original, then the circuits can be employed as described for the above case involving the detection of a background reflecting a great deal of light having markings which reflect very little light.

We claim:

1. In a light detection circuit wherein a light detector is used and an output signal is produced indicative of the light incident upon the light detector with the output signal having a desired stabilizing level representative of light incident upon the light detector, said output signal being applied through a signal leveling circuit to a voltage stabilizing control circuit connected to stabilize the voltage of the output signal, the improvement which comprises a voltage stabilizing circuit including a voltage variable resistance element which is connected in series with the light detector across a voltage source and comparator means having a first input coupled to said output signal and having a second input coupled to the output of said signal leveling circuit, said comparator means producing an output when a light change of short duration is incident upon the light detector.

2. In a light detection circuit wherein a light detector is used and an output signal is produced indicative of the light incident upon the light detector with the output signal having a desired stabilizing level representative of light incident upon the light detector, said output signal being applied through a signal leveling circuit to a voltage stabilizing control circuit connected to stabilize the voltage of the output signal, the improvement which comprises a voltage stabilizing circuit including a voltage variable resistance element which is connected in series with the light detector across a voltage source, a voltage divider, a buffer stage having an input and an output, said buffer stage input being coupled by the voltage divider to the output signal indicative of the light incident upon the light detector, the output of the buffer stage being coupled to the input of the signal leveling circuit and the output of the latter circuit being coupled to the voltage variable resistance element to regulate its resistance.

3. A detection circuit according to claim 1 or 2 wherein the voltage variable resistance element comprises a field-effect transistor.

4. In a light detection circuit wherein a light detector is used and an output signal is produced representative of the light incident upon the light detector with the output signal having a desired stabilizing level representative of light incident upon the light detector, said output signal being applied through a signal leveling circuit with which a voltage is produced that is applied to a voltage stabilizing control circuit connected to stabilize the voltage of the output signal, the improvement comprising:

a voltage variable resistance element coupled in series with the light detector;

means having an input and including an operatively associated integrating feed-back circuit connected to said input for generating a control voltage and applying the control voltage to the voltage variable resistance element to set the resistance thereof at a level selected to establish a desired voltage level for the output signal; and means for combining said control voltage and said output voltage at an input of said generating means.

5. A detection circuit according to claim 4 wherein said generating means comprises:

a differential amplifier having a first input coupled to said combining means and having an output coupled to said integrating feed-back circuit.

6. A detection circuit according to claim 5 wherein said integrating feedback circuit comprises:

a capacitor connected in integrating relationship with the feedback circuit;

a resistor in series with said capacitor, the charge time constant formed by the series connected resistor and capacitor being selected sufficiently long to maintain said control voltage at a level which enables the resumption of the desired voltage level after a short duration change in the light incident upon the light detector; and means for enabling the output of said differential amplifier to rapidly recover a voltage level associated with the desired voltage level after termination of the short duration change.

7. A detection circuit according to claim 6 wherein said enabling means comprises a diode connected in parallel with said resistor.

8. A detection circuit according to claim 7 and further comprising means for supplying a second input with a fixed potential.

9. A detection circuit according to claim 4, 5, 6, 7 or 8 and further including:

comparator means having a first input effectively coupled to the output signal and having a second input effectively coupled to said control voltage for producing an output level representative of a detected change in the light level incident upon said light detector.

10. A detection circuit according to claim 7 or 8 and further comprising:

a comparator having first and second inputs coupled respectively across said diode.

11. A detection circuit according to claim 4, 5, 6, 7 or 8 wherein said voltage variable resistance element comprises a field-effect transistor.

* * * * *